US011261962B2

(12) United States Patent
Mueller et al.

(10) Patent No.: US 11,261,962 B2
(45) Date of Patent: *Mar. 1, 2022

(54) HYDROSTATIC TRAVEL DRIVE AND METHOD FOR CONTROLLING THE HYDROSTATIC TRAVEL DRIVE

(71) Applicant: Robert Bosch GmbH, Stuttgart (DE)

(72) Inventors: Matthias Mueller, Langenau (DE); Michael Frasch, Ulm (DE); Steffen Mutschler, Neu-Ulm (DE); Ulrich Lenzgeiger, Dinkelscherben (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

This patent is subject to a terminal disclaimer.

(21) Appl. No.: 16/455,200

(22) Filed: Jun. 27, 2019

(65) Prior Publication Data

US 2020/0003301 A1 Jan. 2, 2020

(30) Foreign Application Priority Data

Jun. 29, 2018 (DE) ..................... 10 2018 210 685.1

(51) Int. Cl.
*F16H 61/431* (2010.01)
*F16H 61/478* (2010.01)
(Continued)

(52) U.S. Cl.
CPC ........... *F16H 61/431* (2013.01); *F16H 39/00* (2013.01); *F16H 61/4017* (2013.01);
(Continued)

(58) Field of Classification Search
None
See application file for complete search history.

(56) References Cited

U.S. PATENT DOCUMENTS 8,327,638 B2 * 12/2012 Ohtsukasa ............ F16H 61/431
60/445
8,386,136 B2 * 2/2013 Shirao ................... F16H 61/431
701/50
(Continued)

FOREIGN PATENT DOCUMENTS

DE 38 06 1 94 A1 8/1989
DE 197 42 157 A1 4/1999
(Continued)

OTHER PUBLICATIONS

RE-E_92003, Axial piston variable pump, A4VG Series 32, Rexroth Bosch Group, Data Sheet; Edition 06.2018.

*Primary Examiner* — Thomas E Lazo
*Assistant Examiner* — Michael Quandt
(74) *Attorney, Agent, or Firm* — Maginot, Moore & Beck LLP

(57) ABSTRACT

A hydrostatic travel drive includes a hydraulic pump for the purpose of supplying pressure medium to a hydraulic motor of the travel drive that can be coupled to an output, which pump can be coupled to a drive machine. The hydraulic pump has an actuating cylinder with at least one cylinder chamber and a swept volume which can be adjusted via the actuating cylinder, and at least one electrically activatable pressure valve via which the cylinder chamber can be charged with an adjustingly active actuating pressure. The travel drive further includes device via which a pressure of the hydraulic pump can be limited by means of influencing the actuating pressure.

15 Claims, 5 Drawing Sheets

(51) Int. Cl.
*F16H 39/00* (2006.01)
*F16H 61/4017* (2010.01)
*F16H 61/433* (2010.01)
F16H 59/36 (2006.01)
F16H 59/68 (2006.01)

(52) U.S. Cl.
CPC ......... *F16H 61/433* (2013.01); *F16H 61/478* (2013.01); *F16H 2059/366* (2013.01); *F16H 2059/6861* (2013.01)

(56) References Cited

U.S. PATENT DOCUMENTS 9,243,701 B2 * 1/2016 Mueller .................. F16H 41/24
9,580,075 B2 * 2/2017 Kaneko ................. B60W 30/18

FOREIGN PATENT DOCUMENTS

DE           100 37 195 A1    2/2002
DE     10 2013 224 657 A1    6/2015

* cited by examiner

HYDROSTATIC TRAVEL DRIVE AND METHOD FOR CONTROLLING THE HYDROSTATIC TRAVEL DRIVE

This application claims priority under 35 U.S.C. § 119 to application no. DE 10 2018 210 685.1, filed on Jun. 29, 2018 in Germany, the disclosure of which is incorporated herein by reference in its entirety.

TECHNICAL FIELD

The disclosure relates to a hydrostatic travel drive and to a method for controlling the hydrostatic travel drive.

BACKGROUND

A hydrostatic travel drive of the type in question has a hydraulic pump and a hydraulic motor which can be supplied with pressure medium thereby in a closed hydraulic circuit. Here, the hydraulic pump can be coupled to a drive machine, and the hydraulic motor can be coupled to an output, for example an axle or an individual wheel. To control the travel drive in line with demand, at least the primary machine, that is to say the hydraulic pump, has an adjustable displacement volume. This can be adjusted in its magnitude via an adjusting device, for example an actuating cylinder. Here, the actuating cylinder can be charged with pressure medium in dependence on a driver's demand, which is generated, for example, via a gas pedal or brake pedal.

According to the data sheet RE-E 92003 of the applicant, an axial piston displacement pump of swashplate construction is known whose pressure which it provides to the hydraulic circuit can be directly controlled. This occurs via a so-called ET control. Here, the hydraulic pump is physically designed in such a way that the pressure always counteracts the actuating pressure of the actuating cylinder. By virtue of its design, the hydraulic pump has an internal control loop, with the result that, as a result of this construction, the pressure always acts in the direction of its own reduction. Here, in the pump mode of the hydraulic pump, its increase leads to the reduction of the displacement volume and, in the motor mode, to the increase of the displacement volume.

One chamber of the actuating cylinder is assigned to the traction mode of the travel drive and another, counteracting chamber is assigned to the overrun or braking mode of the travel drive. A characteristic map of the hydraulic pump is known by measuring the hydraulic pump in terms of its parameters of pressure, actuating pressure, displacement volume and rotational speed, from which characteristic map, according to a gas pedal or driver's demand, a necessary actuating pressure can be determined. This occurs via an electronic control unit. This control of the hydraulic pump makes it possible to directly assign a drive torque to a position of the gas or accelerator pedal, this being perceived by the operator as a control of the travel drive which is very direct and therefore can be calculated well.

To safeguard the high-pressure-carrying working lines there are generally provided pressure-limiting valves which, from a limit value set on them, discharge pressure medium from the pressure-carrying working line. However, since this is very disadvantageous in energy terms, there is generally provided a so-called pressure cut-off of about 30 bar below the pressure set on the pressure-limiting valve. The pressure cut-off is realized in the aforementioned data sheet in such a way that a separate pressure-limiting valve of smaller size is provided which is charged in the opening direction with the highest of the pressures of the working line and in the closing direction with a set desired value. If the operating pressure reaches the set desired value or cut-off value, a control pressure line in which control pressure medium is provided at a pressure of about 30 bar is relieved via this pressure-limiting valve. Since an actuating pressure of the respective chamber is reduced from the provided control pressure medium via pressure-reducing valves, the maximum providable actuating pressure also drops in this way. In the pump mode, the displacement volume of the hydraulic pump correspondingly pivots back on account of lower actuating pressure, with the result that the pressure or working pressure is limited by the lower delivery volume of the hydraulic pump. This conventional limiting or pressure cut-off is thus based on a hydromechanical control circuit with the aforementioned pressure-limiting valve as hydromechanical regulator.

Disadvantages with this solution prove to be the comparatively high apparatus-related outlay for determining the highest of the pressures of the working lines, the provision of the pressure-limiting valve for pressure cut-off, and the occurring energy loss due to blowing off the control pressure medium via the pressure-limiting valve. In addition, the stated combination of adjustable hydraulic pump under electronic control with hydromechanically controlled pressure cut-off can be controlled only with difficulty, if at all, in transients. In the alternative case of an electronically controlled pressure cut-off on the basis of pressure values detected by pressure sensors, this proves to be oscillation-susceptible and complex.

SUMMARY

Against this background, the object on which the disclosure is based is to provide a hydrostatic travel drive having a pressure cut-off with more stable behavior, and a method for controlling the hydrostatic travel drive with pressure cut-off.

The first object is achieved by a hydrostatic travel drive having the features described herein, and the second by a method for controlling the hydrostatic travel drive having the features described herein.

A hydrostatic travel drive has a hydraulic pump which can be coupled to a drive machine. A hydraulic motor of the travel drive that can be coupled to an output can be supplied with pressure medium via the hydraulic pump. The drive machine, for example a diesel engine or electric motor and/or the output, can be a constituent part of the travel drive. The hydraulic pump is designed with an adjustable displacement or swept volume, an actuating cylinder with at least one cylinder chamber being provided for its adjustment. The actuating cylinder, in particular its piston, can be or is preferably coupled to an actuating element of the hydraulic pump, the swept volume being dependent on the position of said element. In order to charge the at least one cylinder chamber with actuating pressure which is active on the swept volume in an adjusting manner, at least one electrically activatable pressure valve, in particular a pressure-regulating or pressure-reducing valve, is provided and assigned to the cylinder chamber. With the aim of limiting a pressure of the hydraulic pump, with the result that it does not exceed an upper limit for example, the travel drive has a device via which the actuating pressure can be influenced.

Consequently, the influencing of the actuating pressure, in particular by its influence on the swept volume, has the effect of limiting the pressure. This pressure limiting by influencing the swept volume is designated as pressure cut-off and is in contrast to the pressure limiting in which the pressure is limited by blowing off the pressure medium via a pressure-limiting valve which opens at a set pressure limit. According to the disclosure, the device is designed in such a way that the actuating pressure—and consequently the pressure—can be limited in a controlled manner, in particular under model-based control, via it.

Compared with conventional solutions which are based on a regulation of the pressure at its limit and according to which the pressure has to be detected or determined, and as a result the actuating pressure is influenced such that the limit is not exceeded, the solution of pressure cut-off based according to the disclosure on control has a number of advantages. Thus, it has a lower complexity and more stable behavior since an oscillation susceptibility, such as, for example, in regulated pressure cut-off on the basis of pressure sensors, is lower or even eliminated. A conventional solution in which the device is designed as a hydromechanical regulator, for example as a pressure-limiting valve which is charged with the pressure and upon whose activation a provided control pressure from which the actuating pressure is reduced via the pressure valve drops, can be susceptible to only poorly or even uncontrollable transients during transitions from this hydromechanical regulation of the pressure cut-off to the electronic activation of the pressure valve, that is to say to the electronic pump control. In this case, an uncontrolled increase in the swept volume of the hydraulic pump can occur. However, this problem is eliminated with the controlling pressure cut-off according to the disclosure. In addition, it is also possible for example to dispense with a pressure detection for the purpose of regulation, with the result that the hydrostatic travel drive can be designed to be less complicated in apparatus terms and to be more cost-effective.

In a development, the hydraulic pump is constructed or designed in such a way that the pressure counteracts the adjustingly active actuating pressure. Here, the pressure always acts in the direction of its own reduction, with the result that the hydraulic pump has an internal regulating action. In the case of a hydraulic pump designed as an axial piston pump of swashplate construction, this is realized for example in that its control disk is arranged or formed in a twisted manner as an interface between hydrostatic working chambers and the pressure and low-pressure connection.

In a development, the swept volume of the hydraulic pump is adjustable via the actuating cylinder on both sides of a zero volume or a neutral position. This proves to be advantageous in order, with the direction of rotation remaining the same—in particular on account of the drive machine which is preferably designed with a constant direction of rotation—to allow a reversal of direction of travel in a simple manner in apparatus terms without shift transmission.

In order to be able to provide the controlled limiting according to the disclosure both in the traction mode of the travel drive, which corresponds to the pump mode of the hydraulic pump, and in the overrun or braking mode of the travel drive, which corresponds to the motor mode of the hydraulic pump, the actuating cylinder has a second cylinder chamber counteracting the first and an electrically activatable, second pressure valve is provided via which the second cylinder chamber can be charged with an adjustingly active second actuating pressure. According to the disclosure, the pressure of the hydraulic pump can also be limited in a controlled manner by means of influencing the second actuating pressure via the device.

The two pressure valves can have individually separated valve pistons or a common valve piston.

In a development, the device is designed in such a way that, via it, the swept volume of the hydraulic pump or a variable on which the swept volume is based—for example a pivot angle of a swashplate in the case of the hydraulic pump designed as an axial piston machine of swashplate construction—can be determined, in particular calculated, via a balancing of the pressure medium volumetric flow. At least one respective rotational speed of the hydraulic pump and of the hydraulic motor, and its swept volume, are included in particular in the balance. Alternatively or in addition, the travel drive can have a means for detecting the swept volume or the variable.

The travel drive preferably has for this purpose rotational speed detection units which are signal-connected to the device and via which the rotational speeds of the hydraulic pump and of the hydraulic motor can be detected. Alternatively or in addition, the rotational speed of the hydraulic pump can be provided by a control or a rotational speed detection unit of the drive machine.

If the hydraulic motor is designed with a constant swept volume, the current swept volume necessary for the balancing is the nominal swept volume and thus always known. The nominal swept volume is preferably stored in the device, in particular for the purpose of balancing.

If the hydraulic motor is designed with a directly controlled, in particular with an electroproportionally controlled, adjustable swept volume, a characteristic curve of swept volume of the hydraulic motor and its activating current is preferably stored in the device. In this way it is possible via the device to directly extrapolate the swept volume of the hydraulic motor from the activating current.

The swept volume of the hydraulic pump is then given by $V_P = n_M V_M / n_P$.

In a preferred development, the device is designed as an electronic control unit.

In a preferred development, the device has, in particular for both the pump mode and the motor mode of the hydraulic pump, in each case a characteristic curve of the hydraulic pump, in which the actuating pressure, in particular the actuating pressure for the pump mode and the second actuating pressure for the motor mode, is described in dependence on the limit of the pressure and at least on the swept volume of the hydraulic pump or on the variable (pivot angle) on which this swept volume is based. It is thus possible to determine a maximum permissible actuating pressure in the pump mode and where appropriate second actuating pressure in the motor mode for the predetermined limit via the device from an operating state of the hydraulic pump (swept volume or pivot angle of the hydraulic pump).

In order to allow the control according to the disclosure of the actuating pressure and where appropriate second actuating pressure not only at the limit but also for other operating states, in particular in dependence on a driver's demand, the device has, in a development—in particular in each case for the pump mode and the motor mode of the hydraulic pump—a characteristic map or a family of characteristic curves of the hydraulic pump, in which the actuating pressure and where appropriate the second actuating pressure is described in dependence on the pressure and at least on the swept volume of the hydraulic pump or on the variable (pivot angle) of the hydraulic pump on which this swept volume is based.

The accuracy of the control can be increased if, in a development, the actuating pressure and where appropriate the second actuating pressure is described in dependence on the rotational speed of the hydraulic pump in the characteristic curve and/or the characteristic map.

In a development, a maximum permissible actuating pressure to ensure the limit, and where appropriate second actuating pressure, can be determined in dependence on the current swept volume of the hydraulic pump or in dependence on the current swept volume and the current rotational speed via the device from the characteristic curve, and where appropriate the characteristic curves.

For control according to the disclosure of the travel drive not only at the limit, but also in other operating states below the limit, said travel drive has, in a development, a request interface, for example an operator-control interface in the design of an accelerator pedal and/or brake pedal which is/are or can be signal-connected to the device (32). A driver's demand in the form of a speed request can then be transmitted by a driver to the device via said interface.

In a development, an actuating pressure necessary according to the driver's demand, and where appropriate second actuating pressure, can be determined via the device from the characteristic map or maps.

In order to always ensure that the driver's demand is optimally met, but the limit is never exceeded, the device is designed, in a development, in such a way that a lower of the maximum permissible and the necessary actuating pressure can be determined and/or selected via it for the actuating pressure, and where appropriate for the second actuating pressure.

In order finally to be able to activate the pressure valve, and where appropriate the second pressure valve, while ensuring the limit, in a development a valve characteristic curve for each pressure valve is stored in the device, in which characteristic curve a respective electric activating current is described in dependence on the, in particular as lower determined, actuating pressure. The "allowed" electric activating current i can thus be determined via the device from the valve characteristic curve and the one pressure valve can be activated in the pump mode and the, where appropriate, second pressure valve can be activated in the motor mode.

A method for limiting a pressure of a hydraulic pump of a travel drive which is designed according to at least one aspect of the preceding description has, according to the disclosure, a step of controlled limiting of the pressure by means of influencing, in particular controlling, the at least one actuating pressure via the device. Here, and also in the course of the below-stated developments of the method, the advantages which have already been discussed within the scope of the travel drive according to the disclosure apply, thus avoiding the need for a redesignation.

In a development, the method has a step or steps of determining a traction mode or braking mode of the travel drive, and/or determining a direction of travel of the travel drive, and/or selecting characteristic curve and/or characteristic map of the hydraulic pump and/or of the pressure valve in dependence on the determined mode and/or the determined direction of travel, via the device.

In a development, the method has a step of determining the maximum permissible actuating pressure from a characteristic curve of the hydraulic pump, in which the actuating pressure is described in dependence on a limit of the pressure and at least in dependence on a swept volume of the hydraulic pump or on a variable of the hydraulic pump that represents this swept volume, via the device.

In a development, the method has a step of determining a necessary actuating pressure according to a speed request from a characteristic map of the hydraulic pump, in which the actuating pressure is described in dependence on the pressure and at least in dependence on a swept volume of the hydraulic pump or on a variable of the hydraulic pump that represents this swept volume, via the device.

In a development, the method has steps of determining a lower of necessary and maximum permissible actuating pressure, determining an electric activating current of the pressure valve from a valve characteristic curve of the pressure valve, in which the electric activating current is described in dependence on the actuating pressure, according to the determined lower of the actuating pressures, and activating the pressure valve with this activating current, via the device.

The stated steps preferably apply to the pump mode of the hydraulic pump. In its motor mode, the method has, in a development, the same steps with regard to the second actuating pressure for charging the second cylinder chamber.

In a development of the travel drive and/or of the method, a variable specification of the pressure and/or of the limit is provided, with the result that a torque of the hydraulic pump and/or a power of the hydraulic pump can be controlled in dependence on factors, such as, for example, driving speed, temperature or the like.

In the motor mode of the hydraulic pump, an activation of pressure-limiting valves can be prevented during reversing via the pressure cut-off according to the disclosure.

The pressure cut-off according to the disclosure allows a control of a braking pressure during reversing and deceleration.

In a development, a matching of the electronic control according to the disclosure with the actual pump physics is possible: thus, for example, a setting of the hydraulic pump can occur on a test bed under defined conditions, necessary activating signals or currents can be determined on the test bed under defined conditions and be transmitted as parameters to the control unit—in particular to its software—, and an automatic matching of the parameters can occur in the control unit in the sense of a calibrating function.

Particularly in terms of apparatus and method, the control according to the disclosure can be applied in a simple manner to a wide variety of designs and nominal sizes of hydraulic pumps.

BRIEF DESCRIPTION OF THE DRAWINGS

Two exemplary embodiments of a hydrostatic travel drive according to the disclosure and one exemplary embodiment of a method according to the disclosure for controlling it are illustrated in the drawings. The disclosure will now be explained in more detail with reference to the figures of these drawings, in which.

DETAILED DESCRIPTION

Figure 1A:
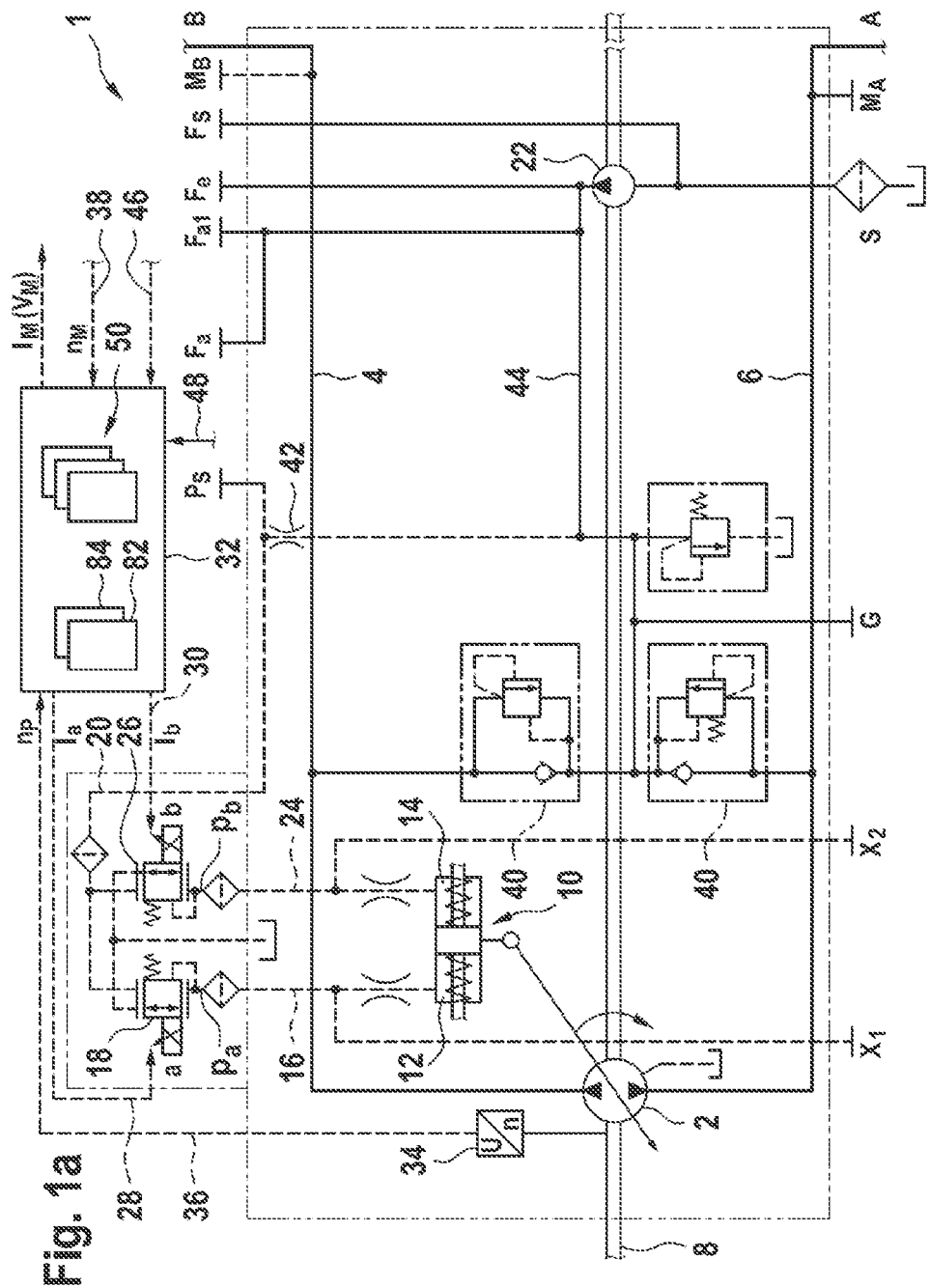
FIG. 1a shows a hydraulic circuit diagram of a hydrostatic travel drive according to a first exemplary embodiment.

According to FIG. 1a, a hydrostatic travel drive 1 has a hydraulic pump 2 which is fluidically connected in a closed hydraulic circuit via the working lines 4 and 6 to a hydraulic motor (not shown) to supply said drive with pressure medium. Here, the hydraulic pump 2 is coupled to a drive machine (not shown) via a drive shaft 8 for transmitting a torque. Here, the coupling is not stepped up, with the result that the rotational speed of the drive machine and of the hydraulic pump 2 are identical. The hydraulic pump 2 is designed as an axial piston pump of swashplate construction and can be operated in both directions of rotation and both in the pump mode and in the motor mode. It has an adjustable displacement volume $V_P$ and an adjusting device 10 designed as a double-acting hydraulic cylinder. The hydraulic cylinder 10 has a first cylinder chamber 12 and a second cylinder chamber 14 which counteracts the first. The first cylinder chamber 12 is connected via a first actuating pressure line 16 to the outlet of a first pressure-reducing valve 18. The latter is connected to a control pressure line 20 which can be supplied with control pressure medium via a control pressure connection $p_S$ and via a feed pump 22 which is seated on the same drive shaft 8 as the hydraulic pump 2. In the same way, the second cylinder chamber 14 is connected via a second actuating pressure line 24 to a second pressure-reducing valve 26 which is connected to the control pressure line 20. The pressure-reducing valves 18, 26 are electromagnetically actuatable, wherein the actuating pressure $p_a$ or $p_b$ resulting in each case in the actuating pressure line 16 or 24 is, according to a valve characteristic curve, proportional to an activating current $I_a$ or $I_b$ of the electromagnet a orb. The actuating pressures $p_a$, $p_b$ of the cylinder chambers 12, 14 can thus be controlled via the electromagnetic actuation of the pressure-reducing valves 18, 26 via the specification of the activating currents $I_a$, $I_b$. For this purpose, the electromagnets a, b of the pressure-reducing valves 18, 26 are signal-connected to an electronic control unit 32 via a respective signal line 28 or 30.

Furthermore, the hydrostatic travel drive 1 has a rotational speed detection unit 34 via which a rotational speed $n_P$ of the hydraulic pump 2 can be detected and via which a signal line 36 can be transmitted to the electronic control unit 32. The travel drive 1 likewise has a rotational speed detection unit (not shown) via which the rotational speed $n_M$ of the hydraulic motor can be detected and via which signal line 38 can be transmitted to the electronic control unit 32.

For safety-relevant pressure safeguarding of the working lines 4, 6 against overload, the hydrostatic travel drive 1 has in each case a pressure-limiting valve 40 which is connected to the respective working line 4, 6. Both pressure-limiting valves 40 are connected by their outlets to a feed pressure line 44 which is connected to the feed pump 22. The feed pressure line 44 is fluidically connected via a throttle 42 to the control pressure line 20. In the case of the activation of the pressure-limiting valves, pressure medium is thus expanded into the feed pressure line 44, with the result that energy losses are lower than if the expansion occurred toward the tank T. The pressure-limiting valves 40 each have a feeding or replenishing function in the form of a nonreturn valve.

The hydrostatic travel drive 1 can be operated both in the traction mode and in the overrun or braking mode. In the traction mode, the hydraulic pump 2 operates in the pump mode, and in the braking mode it operates in the motor mode. In addition, the hydraulic pump 2 is reversible, that is to say its displacement volume $V_P$ is adjustable via the adjusting device 10 on both sides of a neutral position with zero volume $V_P=0$. As a result, a reversal of direction of travel is possible with the direction of rotation of the drive shaft 8 and of the drive machine (diesel engine) remaining the same.

The electronic control unit 32 is connected via a signal line 46 to an operator interface in the form of an accelerator pedal (not shown). Here, a speed request is transmitted to the electronic control unit 32 by a driver via the accelerator pedal. This can concern both the reverse travel and the forward travel. If the accelerator pedal is actuated, this corresponds to the traction or pump mode of the hydraulic pump 2, and if, by contrast, the accelerator pedal is moved back, this corresponds to the braking or motor mode of the hydraulic pump 2. The actuation of a service brake (not shown) also corresponds to the braking or motor mode of the hydraulic pump 2. The control unit is designed in such a way that it can determine the corresponding mode on the basis of said actuation. To select a direction of travel, the hydrostatic travel drive 1 additionally has an actuable direction of travel switch (not shown) which is signal-connected via a signal line 48 to the electronic control unit 32. In dependence on its position, the activation of the hydraulic pump 2 occurs in its reversed or nonreversed adjusting region, that is to say on either side of the neutral position of the swept volume of the hydraulic pump 2. The following driving states may be defined for further consideration:

Forward travel, traction mode: pressurizing the first cylinder chamber 12 via the first actuating pressure line 16 and the first pressure-reducing valve 18 with the first actuating pressure $p_a$ by activating the first pressure-reducing valve 18 with the activating current $I_a$ via the control unit 32 via the first signal line 28.

Forward travel, braking mode: pressurizing the second cylinder chamber 14 via the second actuating pressure line 24 and the second pressure-reducing valve 26 with the second actuating pressure $p_b$ by activating the second pressure-reducing vale 26 with the activating current $I_b$ via the control unit 32 via the signal line 30.

Reverse travel, traction mode: pressurizing the second cylinder chamber 14 via the chain 24, 26, 30, 32.

Reverse travel, braking mode: pressurizing the first cylinder chamber 12 via the chain 16, 18, 28, 32.

In the two depicted exemplary embodiments of a hydrostatic travel drive 1; 101, the hydraulic pump 2 is designed in such a way that the pressure p which prevails in the high-pressure-carrying one of the working lines 4, 6 counteracts the then active actuating pressure $p_a$ or $p_b$ and is active in the direction of its own reduction. For this purpose, the hydraulic pump 2 has a structurally realized control loop. In the present case of the hydraulic pump 2 designed as an axial piston pump of swashplate construction, this is realized in such a way that a control disk of the hydraulic pump 2 is arranged in a twisted manner with respect to an axis of rotation of its cylinder drum. Mouths of those cylinders which are connected to the pressure kidney control disk having the pressure (high pressure) are thus arranged so as to be asymmetrically distributed with respect to a pivot axis of the swashplate. Also asymmetrically distributed are then the end portions, supported on the swashplate, of the working pistons guided in the cylinders. From the thus asymmetrically acting supporting forces of the working pistons there results, on the swashplate, a pivoting-back torque in the pump mode and a pivoting-out torque in the motor mode. There consequently occurs a relationship in the form of a pump characteristic curve or of a characteristic map of pump characteristic curves of the hydraulic pump 2 in which the respective actuating pressure $p_a$, $p_b$ can be described in dependence on the pressure p and on the swept volume $V_P$ of the hydraulic pump 2, and on its rotational speed $n_P$. These characteristic curves or characteristics maps are measured and stored in the electronic control unit 32 for processing, in particular for carrying out the subsequently described method.

Figure 3A:
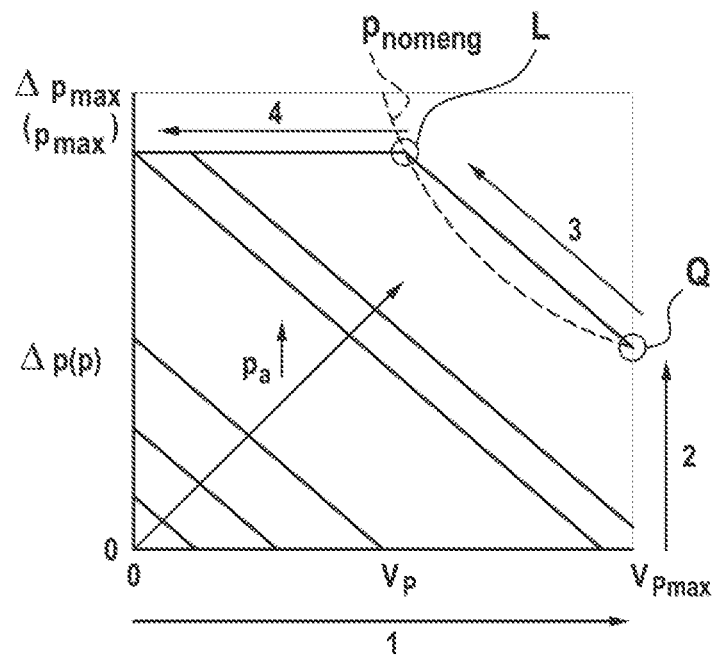
FIGS. 3a and 3b show characteristics of the hydrostatic travel drive according to FIGS. 1a and 1b.
Figure 3B:
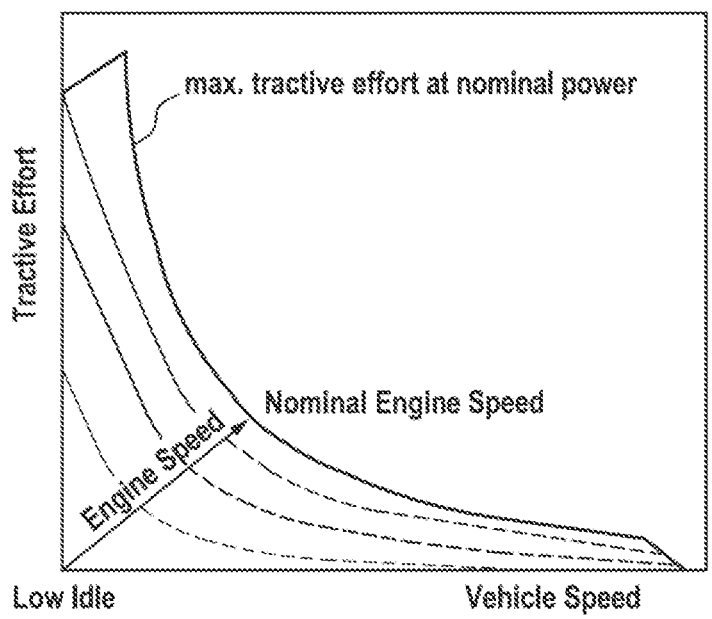

There follows the description of a driving mode of the hydrostatic travel drive 1; 101 with reference to FIGS. 3a, 3b. FIG. 3a illustrates a characteristic of the hydraulic pump 2 with open-loop-control, that is to say with directly controlled displacement or swept volume $V_P$. The pressure p, to be more precise the pressure difference $\Delta p$ between the working lines 4, 6, is plotted in dependence on the displacement volume $V_P$. The first actuating pressure $p_a$ of the first cylinder chamber 12 is plotted as a parameter. This pressure increases starting from the origin 0/0. As limiting power, the nominal power of the diesel drive machine $P_{nomeng}$ is illustrated as a dashed curve. The starting point of the description is taken to be an unactuated gas or accelerator pedal and a drive machine rotating in idle at idle rotational speed. According to the arrow 1, there first occurs an actuation of the gas pedal by the operator, with the result that the rotational speed of the drive machine (diesel) is increased from idle to nominal rotational speed. Accordingly, an activating signal or activating current $I_a$ for the hydraulic pump 2, to be more precise for its first pressure-reducing valve 18, occurs via the electronic control unit 32 in dependence on the rotational speed of the diesel engine. On reaching the nominal rotational speed of the drive machine, a maximum driving speed of the travel drive 1 is obtained. Accordingly, the first actuating pressure $p_a$ is increased according to a characteristic map of the hydraulic pump 2 that is stored in the electronic control unit 32 according to FIG. 1a. Since there is still no load acting, the hydraulic pump 2 pivots out fully to its maximum swept volume $V_{Pmax}$ and delivers its maximum volumetric flow $Q_{max}$ at nominal rotational speed.

As a result of occurring driving resistances, a pressure or load pressure p, for example 250 bar, is established when driving on level ground. This operation is symbolized in FIG. 3a by the arrow designated by the number 2. In the diagram according to FIG. 3a, a point Q is then reached which lies on the curve $P_{nomeng}$. At this point, the first actuating pressure $p_a$ at the nominal rotational speed is dimensioned such that the hydraulic power $p_{Qmax}$ of the hydraulic pump 2 corresponds to the nominal power $P_{nomeng}$.

If then the load on the travel drive 1; 101 increases, for example when traveling uphill or, in the case of a wheeled loader, when loaded with gravel, the pressure p increases. By virtue of the aforementioned design of the hydraulic pump 2 in which, in the traction mode of the hydraulic pump 2 in forward travel, the working pressure p counteracts the first actuating pressure $p_a$ in the direction of a reduction of the swept volume $V_P$, the pressure p pivots back the pivot cradle of the hydraulic pump 2, with the result that the travel slows. The first actuating pressure $p_a$ is not changed in the meantime and corresponds to the straight line (arrow 3) which intersects the point Q and which represents the reduction of the swept volume $V_P$ and simultaneous increase in the pressure p or the pressure difference $\Delta p$.

On reaching a point L in the diagram according to FIG. 3a, a maximum permissible pressure $p_{max}$ or cut-off pressure, or a maximum permissible pressure difference $\Delta p_{max}$, is achieved. The task of the electronic control unit 32 is then to ensure that this limit $p_{max}$, $\Delta p_{max}$ is not exceeded. Accordingly, with further increasing load, there occurs no further increase in the pressure p by virtue of the fact that the first actuating pressure $p_a$ is reduced via the control unit 32 via the pressure-reducing valve 18 according to FIG. 1a in such a way that the pressure $p_{max}$ is not exceeded. Accordingly, a path is followed according to FIG. 3a along a blocking or limit curve which extends horizontally to the left from the point L with constant pressure $p_{max}$ or constant pressure difference $\Delta p_{max}$. If thus, for example, a maximum permissible pressure $p_{max}$ of, for example, 450 bar is set in the control unit 32, the control unit 32 intervenes according to the pressure cut-off according to the disclosure and takes back the first actuating pressure $p_a$. It is thus possible, even with further increasing load, to prevent the maximum permissible pressure $p_{max}$ from being exceeded.

Figure 2:
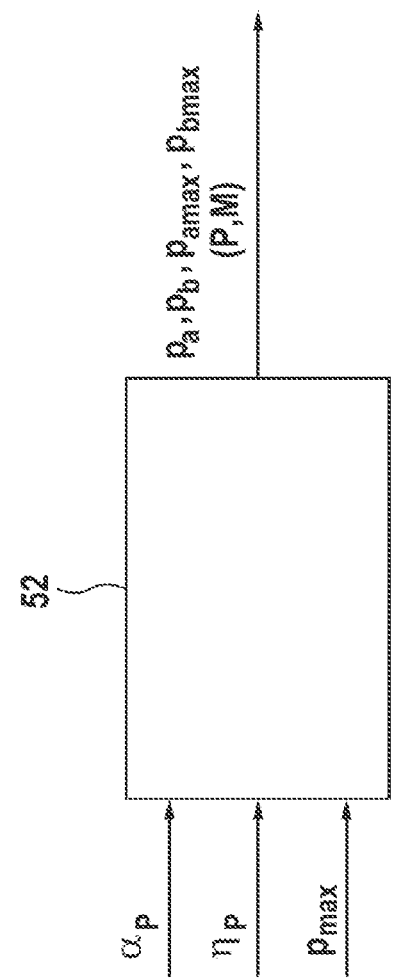
FIG. 2 shows a simple block diagram of a method for controlling the hydrostatic travel drive with input and output variables according to one exemplary embodiment.

FIG. 2 shows a block diagram of one exemplary embodiment of a method 52 according to the disclosure. The following can be mentioned as input variables in the method 52: a pivot angle $\alpha_P$, proportional to the swept volume $V_P$, of the hydraulic pump 2, its rotational speed $n_P$ and the limit $p_{max}$, which is to be defined or is predetermined, of the maximum permissible working pressure. An electronic pressure cut-off function on the data base of an inverted pump characteristic occurs via the method 52. On the one hand, the actuating pressures $p_a$, $p_b$ for the normal driving mode and $p_{amax}$, $p_{bmax}$ as maximum permissible actuating pressures in dependence on the current driving mode ($\alpha_P$, $n_P$) and on the limit $p_{max}$ are obtained as output variable via the method 52. This applies both to the traction or pump mode P and to the braking or motor mode M of the hydraulic pump 2.

The pivot angle $\alpha_P$ or the swept volume $V_P$ can be duly provided to the method 52, for example by detection. Alternatively, however, the method 52 stored in the control unit 32 for execution can have a step of balancing. For this purpose, the pivot angle $\alpha_P$ is determined via the control unit 32 from the detected pump rotational speed $n_P$, hydraulic motor rotational speed $n_M$, and from the swallowing volume $V_M$ of the hydraulic motor that is known from the electro-proportional direct activation. Since no leakage is included in this simple balance, this way of determining the pivot angle $\alpha_P$ represents an estimation.

FIG. 3b shows a characteristic of the vehicle or of the travel drive 1; 101, in which the tractive effort of the travel drive is plotted over the vehicle speed, wherein the nominal rotational speed of the drive machine is represented as a parameter.

Figure 1B:
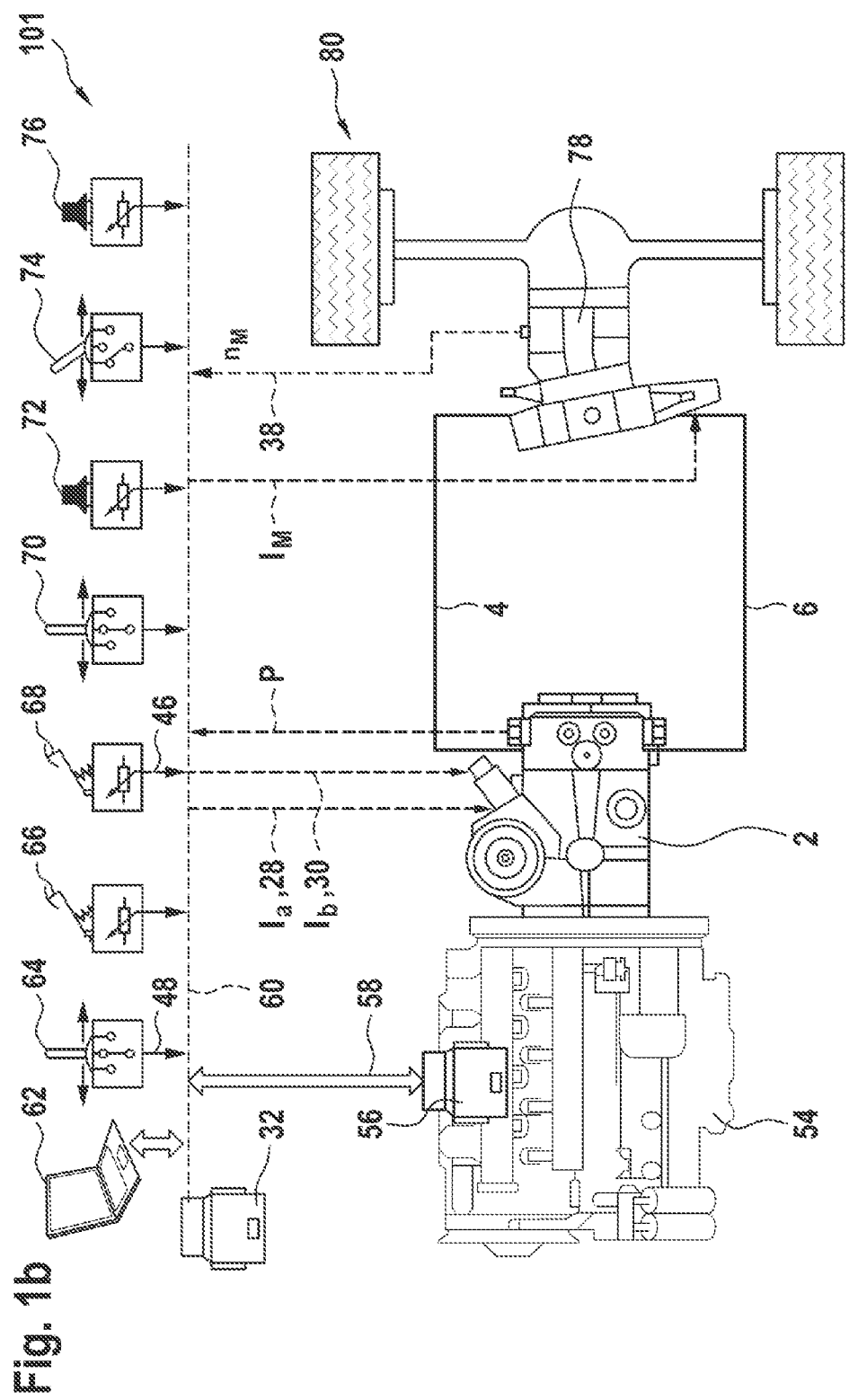
FIG. 1b shows a hydraulic circuit diagram of a hydrostatic travel drive according to a second exemplary embodiment.

FIG. 1b shows a second exemplary embodiment of a hydrostatic travel drive 101 which is substantially identical to that according to FIG. 1a. Only the differences from the aforementioned exemplary embodiment according to FIG. 1a will therefore be discussed. There is now illustrated, in addition, a drive machine 54 which is coupled to the hydraulic pump 2 via the drive shaft 8 according to FIG. 1a and which has a drive machine control device 56. The latter is connected to the electronic control unit 32 via a CAN bus 58 and via a bus 60. Also connected to the bus 60 is a service interface 62 via which an operator or maintenance personnel has/have access to all the components connected to the bus 60. These components are, in addition, a direction of travel switch 64, a brake pedal 66, an accelerator or gas pedal 68, a driving mode selection switch 70, a speed limit switch 72, a speed limit selection switch 74 and a manual throttle switch 76.

An axle or an output 80 is coupled to the hydraulic motor 78 illustrated. The hydraulic motor 78 is arranged via the working lines 4, 6 with the hydraulic pump 2 in the closed hydraulic circuit. It is designed as an axial piston machine of oblique axis construction with adjustable displacement volume $V_M$. Here, its displacement volume $V_M$ is directly controlled in an electroproportional manner and therefore behaves proportionally to an activating current $I_M$ which is output by the electronic control unit 32.

Figure 4:
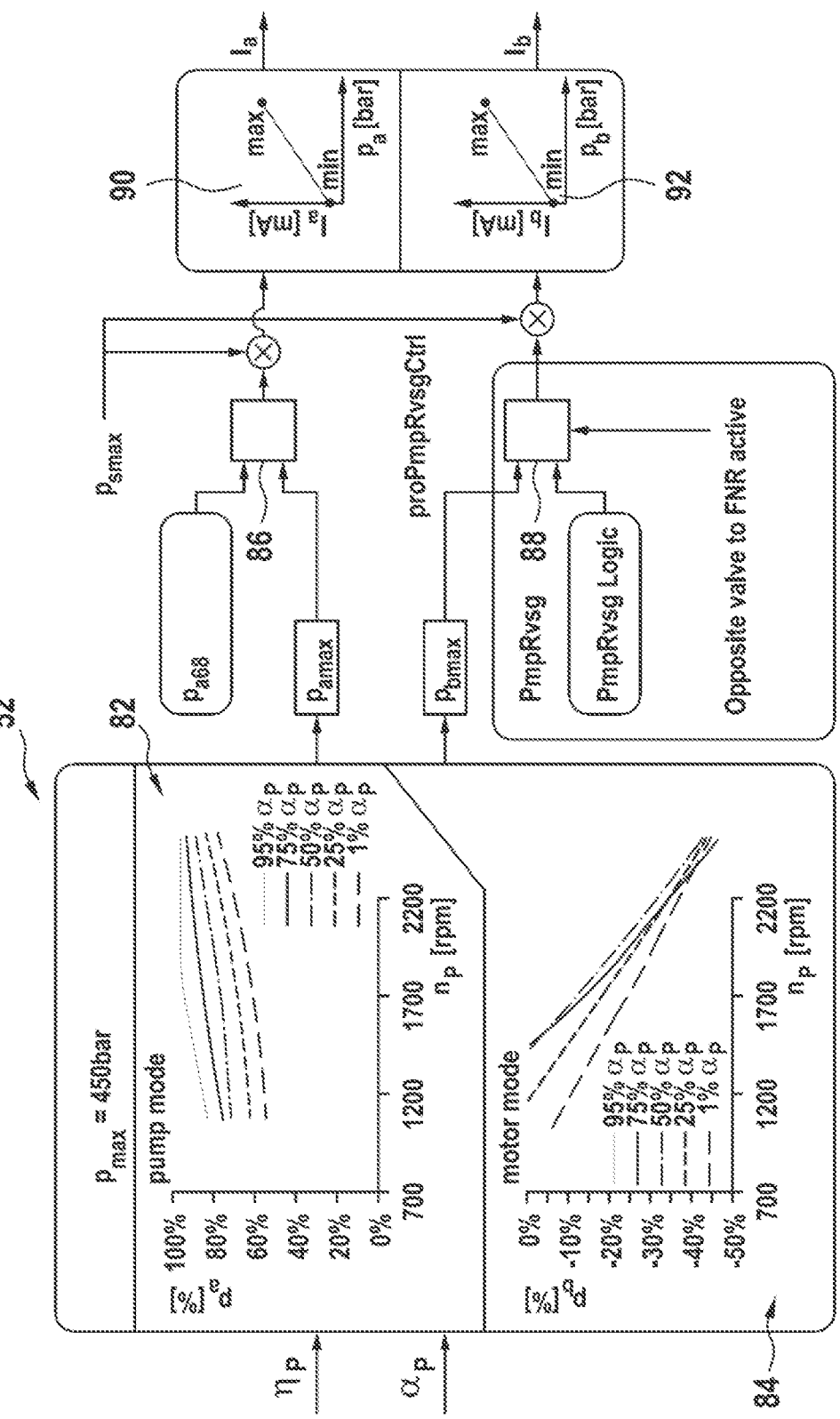
FIG. 4 shows a detailed block diagram of the method according to FIG. 2.

The preceding and the following considerations pertaining to the method 52 according to the disclosure apply to both hydrostatic travel drives 1; 101 according to FIGS. 1a and 1b. There follows the somewhat detailed description of the method 52 according to the disclosure with reference to FIG. 4.

As already mentioned, the input variables of the method are the determined or estimated swept volume $V_P$ or the corresponding pivot angle $\alpha_P$ of the hydraulic pump 2, its rotational speed $n_P$, and a predetermined limit of the pressure or working pressure $p_{max}$, in this case of 450 bar.

According to FIGS. 1a and 1b, an actuating pressure model in the form of a pump characteristic or pump characteristic curve 82 for the operation of the hydraulic pump 2 in the traction mode (pump mode) and 84 for the braking or motor mode of the hydraulic pump 2 is stored in the electronic control unit 32 for each pressure limit $p_{max}$. What is described here is in each case the respective actuating pressure $p_a$ or $p_b$ in dependence on the pump rotational speed $n_P$ and the pump pivot angle $\alpha_P$ (in percent of the maximum pivot angle). The actuation pressures $p_a$ and $p_b$ are also represented in percent of the maximum available control or actuating pressure $p_{smax}$ in the control pressure line 20. Here, the scale of the second actuating pressure $p_b$ provided in the motor mode for the second actuating chamber 14 extends from zero to −50%. The plus and minus sign represents the different direction of action of the pressure on account of the counteracting actuating chambers 12, 14.

According to the method 52, at first the respectively maximum permissible actuating pressure $p_{amax}$ for the traction mode and $p_{bmax}$ for the braking mode is determined in dependence on the current values $n_P$, $\alpha_P$ and $p_{max}$ of the operating state of the travel drive. This occurs permanently anew at fixed limit $p_{max}$, since in particular $\alpha_P$ changes in operation on account of its load dependency. For the traction mode there then occurs the matching of a requested first actuating pressure $p_{a68}$ which originates from the actuation of the accelerator pedal 68 according to FIG. 1b (also valid for FIG. 1a). The last-mentioned actuating pressure and the determined maximum permissible first actuating pressure $p_{amax}$ are compared by the control unit 32 and the lower one is selected in step 86. The same analogously occurs in step 88 with the maximum permissible second actuating pressure $p_{bmax}$. The in each case lower of the actuating pressures selected from the steps 86 and 88 is then again multiplied by the maximum available control pressure $p_{smax}$, whereby an actual actuating pressure $p_a$ or $p_b$ results from the actuating pressure indicated until then in percent. Said actual actuating pressure enters into a respective valve characteristic curve 90 or 92 for the pressure-reducing valve 18 or 26, from which the associated activating current $I_a$ or $I_b$ for activating the pressure-reducing valve 18 or 26 is then determined. In this way there are determined, according to the disclosure, the actuating pressures $p_a$, $p_b$ required in the normal driving mode and the maximum permissible actuating pressures $p_{amax}$, $p_{bmax}$ from the rotational speed $n_P$, the pivot angle $\alpha_P$, the pump characteristic curves 82, 84, the maximum permissible pressure p, the requested actuating pressure $p_{a68}$ and the valve characteristic curves 90, 92, wherein the respectively lower actuating leads to the activating current $I_a$, $I_b$. Should thus the actuating pressure $p_{a68}$ output according to the driver's demand lie above the limit $p_{amax}$ or $p_{bmax}$, the actuating pressure $p_a$ or $p_b$ is limited or cut off.

What is disclosed is a hydraulic machine which can be operated as a pump with a swept volume which can be hydraulically adjusted by means of actuating pressure under electrical control. Here—both for a pump mode and motor mode of the pump—an actuating pressure of the pump for adjusting the swept volume can be limited under electronic control with knowledge of pump physics in dependence on a current pump rotational speed and on a current pump volume under all operating conditions and a maximum limit of a pressure built up by the pump can always be maintained.

Also disclosed is a travel drive with the pump and a method for controlling said travel drive.

The invention claimed is:

1. A hydrostatic travel drive comprising:
    a hydraulic pump coupled to a drive machine and configured to supply pressure medium to a hydraulic motor of the hydrostatic travel drive, the hydraulic motor coupled to an output of the hydrostatic travel drive, the hydraulic pump having an actuating cylinder that includes at least one cylinder chamber and is configured to adjust a swept volume of the hydraulic pump;
    at least one electrically activatable pressure valve configured to charge the at least one cylinder chamber with an adjustingly active actuating pressure; and
    an electronic control unit configured to limit an outlet pressure of the hydraulic pump by controlling the actuating pressure,
    wherein the electronic control unit is configured to limit the outlet pressure using an actuating pressure model, and
    wherein the actuating pressure model includes a characteristic map of the hydraulic pump, in which the actuating pressure is described as a function of the outlet pressure and at least one of the swept volume of the hydraulic pump and of a variable of the hydraulic pump representative of the swept volume.

2. The hydrostatic travel drive according to claim 1, wherein the actuating pressure model includes a characteristic curve of the hydraulic pump, the characteristic curve representing the actuating pressure as a function of a limit of the outlet pressure and at least one of the swept volume of the hydraulic pump and of a variable of the hydraulic pump representative of the swept volume.

3. The hydrostatic travel drive according to claim 2, wherein the actuating pressure is described in the characteristic curve as a function of a rotational speed of the hydraulic pump.

4. The hydrostatic travel drive according to claim 2, wherein the electronic control unit is configured to determine a maximum permissible actuating pressure from the characteristic curve.

5. The hydrostatic travel drive according to claim 1, wherein the actuating pressure is described in the characteristic map as a function of a rotational speed of the hydraulic pump.

6. The hydrostatic travel drive according to claim 1, further comprising:
    a request interface configured be signal-connected to the electronic control unit and configured to transmit a speed request to the electronic control unit.

7. The hydrostatic travel drive according to claim 6, wherein the electronic control unit is configured to determine a necessary actuating pressure based upon the speed request and the characteristic map.

8. The hydrostatic travel drive according to claim 7, wherein the electronic control unit is configured to at least one of (i) determine a lower of a maximum permissible outlet pressure and the necessary actuating pressure, and (ii) select the lower of the maximum permissible outlet pressure and the necessary actuating pressure.

9. The hydrostatic travel drive according to claim 1, wherein the electronic control unit includes a valve characteristic curve of the pressure valve, the valve characteristic curve describing an electric activating current as a function of the actuating pressure.

10. The hydrostatic travel drive according to claim 1, wherein the electronic control unit is configured to limit the outlet pressure to a maximum permissible outlet pressure using the actuating pressure model.

11. A method for limiting an outlet pressure of a hydraulic pump of a travel drive that includes (i) the hydraulic pump, which is coupled to a drive machine and configured to supply pressure medium to a hydraulic motor of the hydrostatic travel drive, the hydraulic motor coupled to an output of the hydrostatic travel drive, the hydraulic pump having an actuating cylinder that includes at least one cylinder chamber and is configured to adjust a swept volume of the hydraulic pump, (ii) at least one electrically activatable pressure valve configured to charge the at least one cylinder chamber with an adjustingly active actuating pressure, and (iii) an electronic control unit configured to limit a pressure of the hydraulic pump, and an actuating pressure model, the method comprising:
determining, with the electronic control unit, a necessary actuating pressure according to a speed request from a characteristic map of the hydraulic pump in the actuating pressure model, the characteristic map representing the actuating pressure as a function of the outlet pressure and at least one of a swept volume of the hydraulic pump and of a variable of the hydraulic pump representative of the swept volume; and
controlling the actuating pressure with the electronic control unit so as to limit the outlet pressure of the hydraulic pump using the determined necessary actuating pressure.

12. The method according to claim 11 further comprising:
at least one of (i) determining, with the electronic control unit, a traction mode or braking mode of the travel drive, and (ii) determining, with the electronic control unit, a direction of travel of the travel drive; and
selecting, with the electronic control unit, at least one of a characteristic curve and a characteristic map of the hydraulic pump and/or of the pressure valve in dependence on the determined mode and/or on the determined direction of travel.

13. The method according to claim 11, further comprising:
determining, with the electronic control unit, a maximum permissible actuating pressure from a characteristic curve of the hydraulic pump, the characteristic curve representing the actuating pressure as a function of a limit of the outlet pressure and at least one of a swept volume of the hydraulic pump and of a variable of the hydraulic pump representative of the swept volume.

14. The method according to claim 13 further comprising:
determining, with the electronic control unit, a lower of the necessary actuating pressure and the maximum permissible actuating pressure;
based on the determined lower of the necessary actuating pressure and the maximum permissible actuating pressure, determining, with the electronic control unit, an electric activating current of the pressure valve from a valve characteristic curve of the pressure valve, the valve characteristic curve representing the electric activating current as a function of the actuating pressure; and
with the electronic control unit, activating the pressure valve with the determined electric activating current.

15. The method according to claim 11, wherein controlling the actuating pressure with the electronic control unit so as to limit the outlet pressure of the hydraulic pump using the actuating pressure model comprises:
controlling the actuating pressure with the electronic control unit so as to limit the outlet pressure of the hydraulic pump to below a maximum permissible outlet pressure limit using the actuating pressure model.

* * * * *